United States Patent

Beck

[11] Patent Number: 5,823,623
[45] Date of Patent: Oct. 20, 1998

[54] GUIDE SLEEVE FOR NECK RESTS ON VEHICLE SEATS

[75] Inventor: Christian Beck, Röttingen, Germany

[73] Assignee: ITW-ATECO GmbH, Norderstedt, Germany

[21] Appl. No.: 828,002

[22] Filed: Mar. 27, 1997

[30] Foreign Application Priority Data

Mar. 30, 1996 [DE] Germany .................. 296 05 983.8

[51] Int. Cl.$^6$ ................................................. A47C 7/36
[52] U.S. Cl. ................ 297/410; 403/108; 403/379
[58] Field of Search ................ 297/410; 403/108, 403/379

[56] References Cited

U.S. PATENT DOCUMENTS

| | | | |
|---|---|---|---|
| 245,639 | 8/1881 | Lay | 297/410 X |
| 3,563,602 | 2/1971 | Ohta et al. | 297/410 |
| 4,478,456 | 10/1984 | Mitsui | 297/410 |
| 4,483,565 | 11/1984 | Terui et al. | 297/410 |
| 4,577,904 | 3/1986 | Wiese et al. | 297/410 |
| 4,604,777 | 8/1986 | Meeks | 297/410 X |
| 5,156,440 | 10/1992 | Vidwans | 297/410 |
| 5,285,869 | 2/1994 | Rock | 403/378 X |
| 5,462,338 | 10/1995 | Baumann | 403/109 X |
| 5,556,224 | 9/1996 | Niskanen | 403/379 |
| 5,605,411 | 2/1997 | Wilson et al. | 403/109 X |
| 5,667,276 | 9/1997 | Connelly et al. | 297/410 |

FOREIGN PATENT DOCUMENTS

| | | | |
|---|---|---|---|
| 3500256 | 6/1986 | Germany | 403/379 |
| 45-17082 | 6/1970 | Japan | 403/108 |
| 2007307 | 2/1994 | Russian Federation | 297/410 |

*Primary Examiner*—Peter M. Cuomo
*Assistant Examiner*—David E. Allred
*Attorney, Agent, or Firm*—Schwartz & Weinrieb

[57] ABSTRACT

A guide sleeve for neck rests on vehicle seats adapted to slidingly accommodate a rod carrying a neck rest, the sleeve comprising an enlargement adjacent to the upper end thereof which extends transverse to the axis of the sleeve, a slider element slidably guided within the enlargement and including a manually operable portion extending outwardly of the enlargement. A pin-shaped metallic locking element is positioned in the slider element adapted to cooperate with the rod on the side opposite to the manually operable portion whereby an axial displacement of the rod is prevented. A spring element of the locking element acts on the slider element to bias the pin element towards the rod, the spring element being formed by a bent elongated spring portion of the pin-shaped locking element which is supported by a rear wall of the enlargement.

17 Claims, 1 Drawing Sheet

GUIDE SLEEVE FOR NECK RESTS ON VEHICLE SEATS

FIELD OF THE INVENTION

The invention refers to a guide sleeve for neck rests on vehicle seats.

BACKGROUND OF THE INVENTION

From German patent publication DE 33 01 073, a guide sleeve for the neck rests of vehicle seats has become known wherein the bore of the sleeve is enlarged at the upper end thereof, with the enlargement accommodating an elongated spring element which is formed of sheet material and includes two legs bent at the rear end. The legs engage a support portion of the enlargement. The bent legs cross each other and engage the support portion by curved end portions. The web of the spring coacts with a rod, of the neck rest which is guided by the guide sleeve, in order to axially fix the rod in that it engages a recess of the rod. The spring is actuated by means of a U-shaped slider element, with the ends of the legs thereof being located on opposite sides of the rod and engaging the web. By actuation of the slider the spring is disengaged from the rod of the neck rest.

From German patent publication DE 44 09 557, a guide sleeve for neck rests on vehicle seats has become known which uses a U-shaped spring, with the transverse portion of the spring being supported by a wall of the enlargement, and the legs of the spring extending on opposite sides of the rod of the neck rest in order to engage opposite recesses of the rod. A slider element has cam surfaces coacting with the legs of the spring in order to disengage the legs from the rod. The spring used is for example produced from suitable wire material, and its manufacture is less expensive than the spring element of the guide sleeve mentioned above in connection with DE 33 01 073.

It is also known to use a pin or a wire as a locking element which extends through the legs of a U-shaped slider element disposed in the enlargement. The slider element is biased by two separate coil springs. Such a design results in an improved locking of the rod for the neck rest, however, has the disadvantage that it comprises a larger number of parts. Besides the sleeve including the enlargement, two springs, a slider element, the locking pin, and a cover cap are required. The latter serves as a closure for an opening in the enlargement opposite to the operable portion.

OBJECT OF THE INVENTION

It is an object of the invention to improve a guide sleeve of the kind mentioned and to reduce the expense for the manufacture thereof by using a smaller number of parts without affecting the function and operability of the guide sleeve.

SUMMARY OF THE INVENTION

In the guide sleeve according to the invention, a spring element and pin-shaped locking element are integrally formed in that the spring element is formed as an extension of the pin-shaped element which is bent back and engages the associated wall of the enlargement. Preferably, the enlargement is integrally formed with the guide sleeve. A specific cover cap is not necessary. The locking element and spring are defined by one part. Nevertheless, an effective locking state is obtained by the pin-shaped portion in the slider element. Therefore, with the guide sleeve according to the invention, only three parts are required, namely, the sleeve, slider element and locking element.

In accordance with a preferred embodiment of the inventions the locking pin and spring portion are shaped in the form of a hair pin. It is preferably formed of material circular in cross section.

Preferably, the slider element is releasably attached to the enlargement so that it may not drop from the sleeve prior to the assembly or after the removal of the rod, respectively. If the rod is within the guide sleeve, the slider element is prevented from being removed due to the engagement of the locking element with the rod. The locking or snapping action, respectively, therefore can be relatively weak. It can be simply released, for example, by means of a tool which is introduced from below or from above through a hole in the enlargement in order to move the parts away from each other.

BRIEF DESCRIPTION OF THE DRAWINGS

Various other objects, features, and attendant advantages of the present invention will be more fully appreciated from the following detailed description when considered in conjunction with the accompanying drawings, wherein.

DETAILED DESCRIPTION OF THE PREFERRED EMBODIMENT

Figure 1:
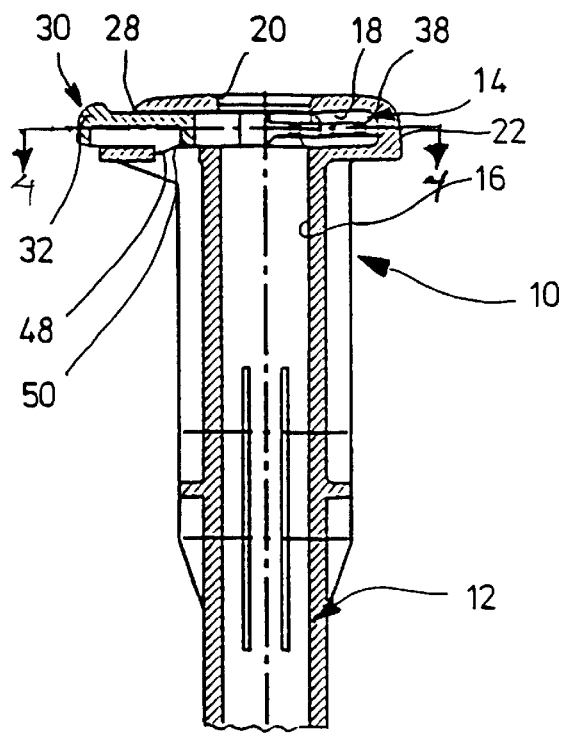
FIG. 1 is a cross section of the upper portion of a guide sleeve for a neck rest according to the invention.
Figure 2:
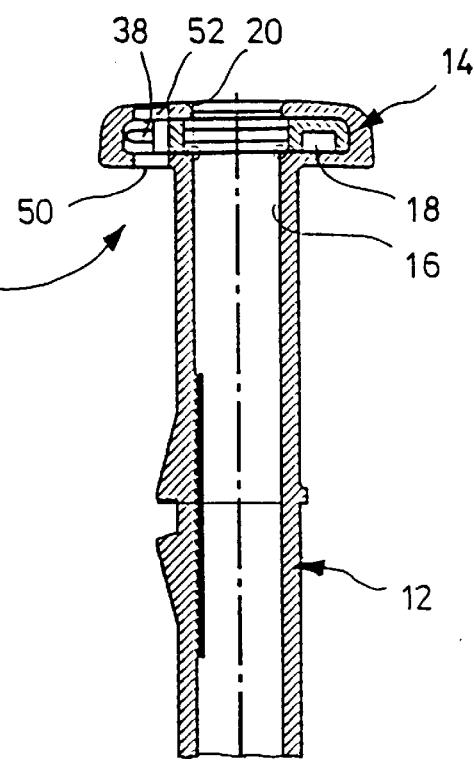
FIG. 2 is a similar cross section as that of FIG. 1, however, turned about 90°.
Figure 3:
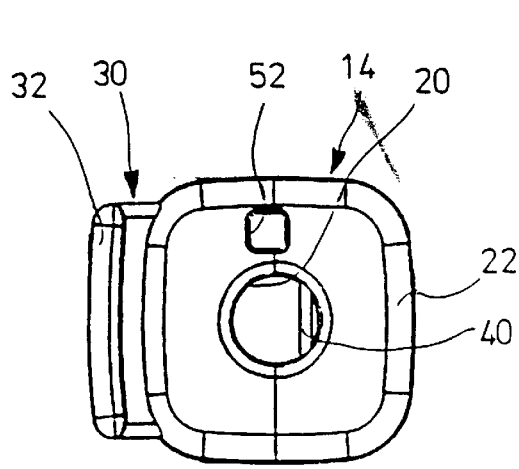
FIG. 3 is a plan view of the guide sleeve of FIG. 1.
Figure 4:
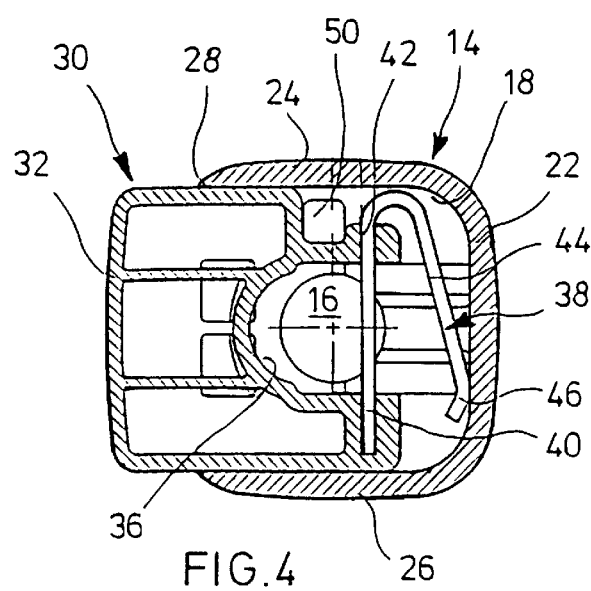
FIG. 4 is a cross section through the guide sleeve of FIG. 1 along line 4—4 of FIG. 1.

A guide sleeve for a neck rest is shown in FIGS. 1 and 2 and is generally designated by reference character 10. It includes a hollow cylindrical sleeve portion 12 which is only partially shown, and a head 14 extending radially beyond the sleeve portion 12. As can be seen in FIGS. 3 and 4, the head 14 has an approximately square contour with rounded corners. A cylindrical bore 16 of sleeve portion 12 is provided with an approximately square enlargement 18 in the area of head 14 which is reduced within head 14 back to the diameter of bore 16 as at 20. The enlargement 18 is defined at the rear side by a rear wall 22 and by side wall portions 24, 26. An opening 28 is positioned opposite to the rear wall 22 and extends along the total width of head 14.

A slider element 30 is displaceably located in the enlargement 18. It includes a portion 32 extending beyond the enlargement 18 and forming a manually operable portion which can be particularly seen in FIGS. 1 and 3. Lateral portions of slider element 30 are slidably guided by the inner surfaces of side walls 24, 26. At the side facing rear wall 22 the slider element 30 has a recess 36 with an arc-shaped surface. The recess 36 embraces bore 16 or opening 20, respectively.

A spring element 38 shaped like a hair pin and made of spring wire material has a straight portion 40 which extends through a bore 42 on one side of a portion of the slider element 30 defining recess 36. It traverses the recess 36 and is inserted into a bore in the opposite portion of the slider element 30.

A rearwardly bent portion 44 of spring element 38 has a bent portion 46 which engages rear wall 22 and thus biases the slider element 30 outwardly. As can be seen in FIGS. 3 and 4, straight portion 40 traverses bore 16 and may engage the rod of a neck rest which is inserted into bore 16. Portion 40 engages the rod laterally and snaps into a recess in order to lock the rod axially. In order to unlock or release the neck rest rod, it is necessary to push the operable portion 32 inwardly in order to urge the slider element 30 to the right in FIGS. 3 and 4 until straight portion 40 is disengaged from the recess of the neck rest rod.

The slider element 30 is locked in the enlargement 18 by means of a detent edge portion as shown at 48. If a tool is introduced through the lower opening 50, the slider element 30 can be somewhat lifted and thus removed from the locked position in order to be removed from the enlargement 18. The spring element 38 is automatically removed therewith. Also the upper side of head 14 is provided with an opening 52.

Obviously, many modifications and variations of the present invention are possible in light of the above teachings. It is therefore to be understood that within the scope of the appended claims, the present invention may be practiced otherwise than as specifically described herein.

I claim:

1. A guide sleeve for neck rests on vehicle seats, comprising:

bore means, defining a vertical axis of said guide sleeve, for slidably accommodating a vertically movable rod supporting a neck rest;

an enlargement disposed adjacent to the upper end of said guide sleeve and extending transversely with respect to said axis of said guide sleeve, said enlargement comprising an end wall, a pair of oppositely disposed side walls connected to opposite ends of said end wall, and an open end disposed opposite said end wall;

a slide element slidably guided within said enlargement between said pair of oppositely disposed side walls and toward and away from said end wall, and including a manually operable portion formed upon one end of said slide element and extending outwardly from said enlargement through said open end of said enlargement, and a pair of laterally spaced support portions, formed upon a second end of said slide element opposite said manually operable portion, and disposed upon opposite sides of said bore means;

a locking element having laterally spaced end portions fixedly mounted upon each one of said laterally spaced support portions of said slide element such that said locking element is movable with said slide element within said enlargement between a first position at which a central portion of said locking element is engaged with the vertically movable rod disposed within said bore means and supporting the neck rest so as to prevent axial displacement of the rod and the neck rest supported thereby whereby the rod and the neck rest supported thereby are fixed at a first vertical position, and a second position at which said central portion of said locking element is disengaged from the vertically movable rod disposed within said bore means and supporting the neck rest so as to permit axial displacement of the vertically movable rod and the neck rest supported thereby whereby the vertically movable rod and the neck rest supported thereby can be moved to a second vertical position; and spring means engaged with said end wall of said enlargement for biasing said slide element away from said end wall of said enlargement and outwardly through said open end of said enlargement and for biasing said locking element toward said first position so as to achieve engagement of said central portion of said locking element with the vertically movable rod disposed within said bore means and supporting the neck rest, and yet permitting movement of said slide element toward said end wall of said enlargement and movement of said locking element mounted upon said slide element toward said second position against the bias of said spring means so as to achieve disengagement of said central portion of said locking element from the vertically movable rod disposed within said bore means and supporting the neck rest, wherein said spring means and said locking element comprise a one-piece integral element.

2. The guide sleeve of claim 1, wherein:

a head portion of said guide sleeve, within which said enlargement is defined, is integrally formed with said guide sleeve.

3. The guide sleeve of claim 1, further comprising:

releasable means defined between said slide element and said enlargement for releasably mounting said slide element within said enlargement of said guide sleeve yet preventing the inadvertent disengagement of said slide element from said enlargement of said guide sleeve.

4. The guide sleeve of claim 3, further comprising:

aperture means defined within said enlargement for permitting insertion of a tool into said enlargement so as to release said releasable means and permit said slide element to be removed from said enlargement.

5. A guide sleeve as set forth in claim 1, wherein:

said one-piece integral element comprising said locking element and said spring means has a substantially U-shaped configuration.

6. A guide sleeve as set forth in claim 5, wherein:

said locking element comprises a locking pin comprising one leg of said substantially U-shaped one-piece integral element; and said spring means comprises another leg of said substantially U-shaped one-piece integral element.

7. A guide sleeve as set forth in claim 1, wherein:

said one-piece integral element is fabricated from a metallic material.

8. A guide sleeve as set forth in claim 1, wherein:

said pair of laterally spaced support portions of said slide element have bores defined therein; and said laterally spaced end portions of said locking element are disposed within said bores of said laterally spaced support portions of said slide element.

9. A guide sleeve as set forth in claim 1, wherein:

said slide element is slidably disposed within said enlargement in a rectilinear manner between said pair of oppositely disposed side walls and toward and away from said end wall of said enlargement.

10. A guide sleeve for neck rests on vehicle seats, comprising:

bore means, defining a vertical axis of said guide sleeve, for slidably accommodating a vertically movable rod supporting a neck rest of a vehicle seat;

an enlargement disposed upon said guide sleeve and comprising an end wall, a pair of oppositely disposed side walls connected to opposite ends of said end wall, and an open end disposed opposite said end wall;

a slide element slidably disposed within said enlargement for movement in a plane transverse to said vertical axis of said guide sleeve and between said pair of oppositely disposed side walls and toward and away from said end wall, and including a manually operable portion formed upon one end of said slide element and projecting through said open end of said enlargement so as to be disposed externally of said enlargement, and a pair of laterally spaced support portions, formed upon a second end of said slide element opposite said manually operable portion and disposed upon opposite sides of said bore means;

a locking element having laterally spaced end portions fixedly mounted upon said each one of laterally spaced support portions of said slide element such that said locking element is movable with said slide element within said enlargement between a first position at which a central portion of said locking element is engaged with the vertically movable rod disposed within said bore means and supporting the neck rest so as to prevent axial movement of the rod and the neck rest supported thereby whereby the rod and the neck rest supported thereby would be locked at a selected vertical position with respect to a vehicle seat, and a second position at which said central portion of said locking element is disengaged from the vertically movable rod disposed within said bore means and supporting the neck rest so as to permit axial movement of the vertically movable rod and the neck rest supported thereby whereby the vertically movable rod and the neck rest supported thereby can be selectively vertically adjusted to a second vertical position with respect to a vehicle seat; and means engaged with said end wall of said enlargement for biasing said slide element away from said end wall of said enlargement and outwardly through said open end of said enlargement and for biasing said locking element toward said first position so as to achieve engagement of said central portion of said locking element with the vertically movable rod disposed within said bore means of said guide sleeve and supporting the neck rest, and yet permitting movement of said slide element toward said end wall of said enlargement and movement of said locking element mounted upon said slide element toward said second position against the bias of said biasing means so as to achieve disengagement of said central portion of said locking element from the vertically movable rod disposed within said bore means of said guide sleeve and supporting the neck rest thereon, said biasing means and said locking element comprising a one-piece integral element.

11. A guide sleeve as set forth in claim 10, wherein:

said one-piece integral element comprising said biasing means and said locking element has a substantially U-shaped configuration.

12. A guide sleeve as set forth in claim 11 wherein:

said locking element comprises a locking pin comprising one leg of said substantially U-shaped one-piece integral element and said biasing means comprises a movable spring element defining another leg of said substantially U-shaped one-piece integral element.

13. A guide sleeve as set forth in claim 10, wherein:

said pair of laterally spaced support portions of said slide element have bores defined therein; and said laterally spaced end portions of said locking element are disposed within said bares of said laterally spaced support portions of said slide element.

14. A guide sleeve as set forth in claim 10, wherein:

said enlargement is formed upon an upper end portion of said guide sleeve.

15. The guide sleeve as set forth in claim 10, further comprising:

releasable means defined between said slide element and said enlargement for releasably mounting said slide element within said enlargement of said guide sleeve yet preventing the inadvertent disengagement of said slide element from said enlargement of said guide sleeve.

16. The guide sleeve as set forth in claim 15, further comprising:

aperture means defined within said enlargement for permitting insertion of a tool into said enlargement so as to release said releasable means and permit said slide element to be removed from said enlargement.

17. A guide sleeve as set forth in claim 10, wherein:

said slide element is slidably disposed within said enlargement in a rectilinear manner between said pair of oppositely disposed side walls and toward and away from said end wall of said enlargement.

\* \* \* \* \*